United States Patent
Truscott et al.

(10) Patent No.: US 9,354,624 B2
(45) Date of Patent: May 31, 2016

(54) METHOD OF SIMULATING ENGINE OPERATION

(75) Inventors: Anthony J. Truscott, West Sussex (GB); Robert David Norris, West Sussex (GB); Steven Andrew Amphlett, West Sussex (GB); Peter John Miller, Bedfordshire (GB)

(73) Assignee: Ricardo UK Limited, West Sussex (GB)

( * ) Notice: Subject to any disclaimer, the term of this patent is extended or adjusted under 35 U.S.C. 154(b) by 1086 days.

(21) Appl. No.: 12/520,849

(22) PCT Filed: Dec. 21, 2007

(86) PCT No.: PCT/GB2007/004954
§ 371 (c)(1),
(2), (4) Date: Oct. 30, 2009

(87) PCT Pub. No.: WO2008/078097
PCT Pub. Date: Jul. 3, 2008

(65) Prior Publication Data
US 2010/0063790 A1   Mar. 11, 2010

(30) Foreign Application Priority Data
Dec. 22, 2006 (GB) .................................... 0625832.1

(51) Int. Cl.
*G06G 7/48* (2006.01)
*G05B 17/02* (2006.01)

(52) U.S. Cl.
CPC ...................................... *G05B 17/02* (2013.01)

(58) Field of Classification Search
CPC .............................. G06F 17/5009; G05B 17/02
USPC ........ 703/6; 711/162; 123/396, 198 D; 701/29
See application file for complete search history.

(56) References Cited

U.S. PATENT DOCUMENTS

| | | | |
|---|---|---|---|
| 5,685,268 A * | 11/1997 | Wakemen | 123/198 D |
| 6,178,947 B1 * | 1/2001 | Machida et al. | 123/396 |
| 6,470,247 B1 * | 10/2002 | Meyer et al. | 701/29 |
| 2004/0019469 A1 | 1/2004 | Leary et al. | |
| 2005/0022797 A1 | 2/2005 | Ikemoto et al. | |
| 2007/0283110 A1 * | 12/2007 | Arai et al. | 711/162 |

FOREIGN PATENT DOCUMENTS

WO   02/086670 A2   10/2002
WO   2006/007621 A2   1/2006

OTHER PUBLICATIONS

Manik Narula et al., "Implementation of a real time GT-POWER model for hil simulation," Nov. 15, 2005, 2005 GT-SUITE US Conference, 17 pages.*

(Continued)

*Primary Examiner* — Kamini S Shah
*Assistant Examiner* — Russ Guill
(74) *Attorney, Agent, or Firm* — Osha Liang LLP (57) ABSTRACT

A method of creating a simplified computer implementable engine model includes obtaining a complete computer implementable engine model and selecting, from the complete engine model, elements defining the simplified engine model. The method further includes obtaining from a library of rules at least one computer implementable model creation rule corresponding to the selected elements and using that at least one rule to create the simplified computer implementable engine model.

10 Claims, 6 Drawing Sheets

(56) References Cited

OTHER PUBLICATIONS

Jesper Ritzen, "Modelling and fixed step simulation of a turbo charged diesel engine," 2003, Linkopings universitet, pp. 1-40.*
Paul Baracos et al., "Enabling PC-based HIL simulation for automotive applications," 2001, IEEE International Electric Machines and Drives Conference, pp. 721-729.*
Robert W. Weeks et al., "Automotive engine modeling for real-time control using matlab/Simulink," 1995, Society of Automotive Engineers, pp. 1-15.*
G.E.P. Box et al., "A useful method for model-building," 1962, TEchnometrics, vol. 4, No. 3, p. 301.*
Ernest O. Doeblin, "System dynamics: modeling, analysis, simulation, design," 1998, Marcel-Dekker, pp. 23-24.*
Chung-Gong Kim, "A crank angle resolved cidi engine combustion model with arbitrary fuel injection for control purpose," 2004, The Ohio State University, pp. 1-266.*
Jason Scott Souder, "Closed-Loop Control of a Multi-Cylinder HCCI Engine," 2004, University of California Berkeley, pp. 1-186.*
"GT-SUITE," Nov. 12, 2006, downloaded from the Wayback Machine for www.gtisoft.com/broch_gtsuite.html, eleven pages.*
"GT-POWER," Nov. 12, 2006, downloaded from the Wayback Machine for www.gtisoft.com/broch_gtpower.html, five pages.*
Iakovos Papadimitriou et al., "Neural network based fast-running engine models for control-oriented applications," Apr. 11, 2005, SAE International, 12 pages.*
C.D. Rakopoulos et al., "Sensitivity analysis of transient diesel engine simulation," Jan. 1, 2006, Proceedings of the Institute of Mechanical Engineers, Part D: Journal of Automobile Engineering, vol. 220, No. 1, pp. 89-101.*
Y.H. Zweiri et al., "A comparison of dynamic models of various complexity for diesel engines," 2002, Mathematical and Computer Modelling of Dynamical Systems, vol. 8, No. 3, pp. 273-289.*
C.D. Rakopoulos et al., "Review of thermodynamic diesel engine simulations under transient operating conditions," paper 2006-01-0884, Apr. 3, 2006, SAE International, 38 pages.*
Y.H. Zweiri et al., "Detailed analytical model of a single-cylinder diesel engine in the crank angle domain," 2001, Proceedings of the Institutue of Mechanical Engineers, Part D, vol. 215, pp. 1197-1216.*
"Programming Guide," 2005, IBM, 118 pages.*
Jon M. Smith, "Mathematical modeling and digital simulation for engineers and scientists," 1987, John Wiley & Sons, pp. 372-394.*
N. Watson, "Dynamic turbocharged diesel engine simulator for electronic control system development," 1984, Journal of Dynamic Systems, Measurement, and Control, vol. 106, pp. 27-45.*
Alain Chevalier et al., "On the validity of mean value engine models during transient operation," 2000, Society of Automotive Engineers, 24 pages.*
International Search Report for PCT/GB2007/004954 mailed Apr. 7, 2008 (5 pages).
Written Opinion of ISA for PCT/GB2007/004954 mailed Apr. 7, 2008 (7 pages).
Search Report from the GB Patent Office dated Mar. 29, 2007 for GB0625832.1 (3 pages).
"www.mathworks.com/products/simulink" Jun. 22, 2009 (4 pages).
"A New Model for the Air and Gas Dynamics in ICE Manifolds Oriented to Air-Fuel Ratio Control," Cippollone et al., Paper No. 99-ICE-170, ICE—vol. 32.1, 1999 Spring Technical Conference, ASME 1999).

* cited by examiner

METHOD OF SIMULATING ENGINE OPERATION

BACKGROUND

1. Field of the Disclosure

This invention relates to a method of simulating engine operation, and particularly to creating a simplified engine model.

2. Background Art

A range of modelling approaches is known for simulating engine operation. These are used, for example, in the development and testing of control strategies for engines. In many cases, due to their simplicity, modelling approaches enable simulation results to be obtained quickly. However, the results obtained are inaccurate due to the degree of approximation used.

A more complex known modelling technique is crank-resolved modelling. In crank resolved models, the cylinders of an engine are divided into sections. The propagation effects along the cylinders are then analysed. In crank resolved simulations, full partial differential equations are solved in order to capture wave-action effects in an engine. This approach to modelling is accurate as it looks at engine characteristics, and takes into account individual in-cycle events. However, due to the complexity of the computations involved, it is not possible to obtain simulation results on a real-time basis using known crank-resolved modelling techniques.

Mean value modelling is another known technique used in engine operation simulation. This approach uses calibration data obtained from tests run on engine test beds. The calibration data is used to approximate the behaviour of some or all of the components of an engine during a simulated engine cycle. Mean value modelling is useful because is it can produce real-time results in a simulation cycle. However, mean value modelling is only capable of representing the output effects of engine behaviour. Mean value models do not simulate for example angle-by-angle variation of simulation quantities that can be used for modern control algorithms. Nor do they attempt to capture wave-action effects caused by pressure propagating along pipes in an engine. It will be appreciated by the skilled person that wave effects should preferably be considered to model tuning of an engine, as this enables the user to size engine components and optimise performance.

A number of modelling packages are known which aim to combine the known modelling approaches to produce an engine model which outputs accurate results in real time. For Example, SimuQuest has produced a real-time crank resolved simulation model, Enginuity. This simulation model is capable of integrating other vehicle components with an engine model to produce real-time simulation results. However, all components outside the combustion chamber in the Enginuity model are represented by mean value models. The results output are therefore based on approximations for most of the vehicle, which compromises the accuracy of the results obtained from the simulation.

A problem which remains with existing modelling techniques is the inability to model in-cycle engine events to produce accurate simulation results on a real-time basis. Instead, current methods focus on increasing the complexity of crank resolved models, making them less suitable for producing real-time simulation results, and then relying on approximated control-based models in real-time simulations.

SUMMARY OF THE DISCLOSURE

The invention is set out in the claims. Because the simplified engine model is created from a complete engine model, it contains sufficient information to produce accurate simulation results whilst still being suitable for real-time implementation. This enables the simplified model to be used in development and testing of engine control strategies without relying on calibration data. The extent and complexity of the simplified engine model can be tailored by the user. In particular, the user can select model and can further focus on or disregard particular engine elements between the start and end points, depending on their requirements for a particular simulation. Embodiments take into account wave-action effects throughout the engine without relying on calibration data and approximations, harnessing the accuracy of a crank resolved model in a manner which enables accurate simulation results to be output in real-time.

The simplified engine model employs simplified mathematical functions in order to achieve accurate simulation results in real time. In addition, the simplified engine model software harnesses the operational characteristics of the modelling hardware in order to increase the efficiency of engine simulation using the model. The simplified engine model can be employed in engine simulations in any of a software, hardware or real engine environment. Hence there is provided a practical method and tool for simulating engine operation accurately and efficiently.

BRIEF DESCRIPTION OF DRAWINGS

Embodiments of the invention will now be described, by way of example, with reference to the Figures of which.

DETAILED DESCRIPTION

In overview, the invention relates to a method of creating a simplified engine model for simulating engine operation. A modelling tool is employed which uses information from a complete engine model to create the simplified engine model. This simplified engine model can then be used to simulate engine operation and produce accurate simulation results in real time. The simplified engine model can run in several different simulation or other operational environments, including software-in-the-loop, hardware-in-the-loop and within an engine control unit.

Figure 1:
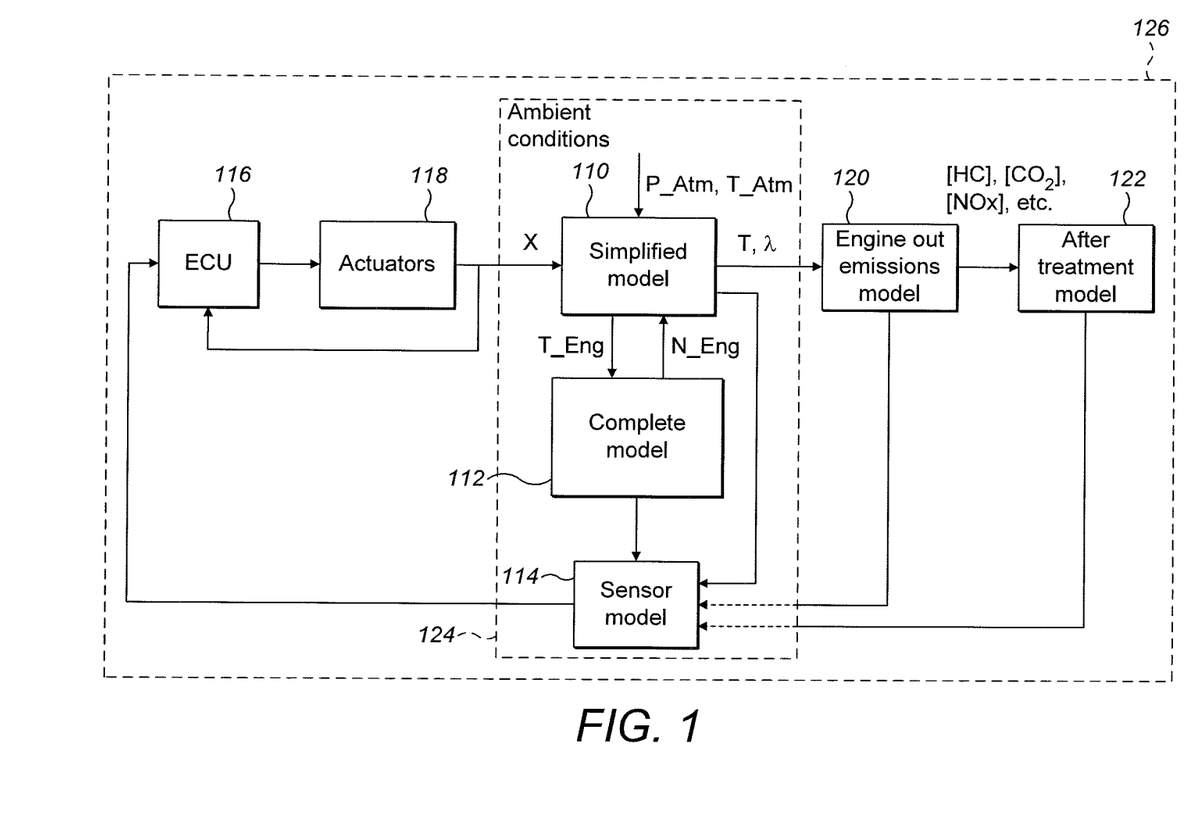
FIG. 1 shows a control interface overview of the modelling tool.

Referring to FIG. 1, the control interfaces for models or model components according to the present invention can be seen in more detail. The interfaces are between an engine model 110 comprising a description of basic engine model components or building blocks along with their connectivity and parameters, an existing complete vehicle model 112 and a number of different engine control development and test systems 116, 118, 120, 122.

The complete vehicle model 112 provides a full representation of the components of a vehicle, and inputs to and receives outputs from the engine model 110 which includes a complete description of air flow throughout the entire engine. An example software package for producing one such engine model is WAVE® available from Ricardo UK Ltd, Shoreham-by-Sea, United Kingdom. WAVE® is a 1-dimensional gas dynamics simulation software package used to simulate internal combustion engine systems. It solves mass, momentum and energy equations for the gases moving through the engine in the time domain to predict overall engine operation. It is used by engineers for engine design and development.

The engine model 110 outputs an engine torque value to the complete vehicle model 112 which has an output to one or more sensor models 114 such as a dynamometer model which also receives appropriate outputs from the engine model 110. During an engine operation simulation cycle, the sensor models 114 provide an output to a real or modelled ECU 116 which in turn sends control values to real or modelled actuators, 118.

The model 110 also interfaces with an engine-out emissions model 120 and aftertreatment model 122. Engine out emissions may be modelled empirically, which allows the testing of aftertreatment models. The emission and aftertreatment models also provide outputs to the sensor model 114.

As a result it can be seen that the basic vehicle components and operation can be modelled in a modular fashion taking into account all of the principal operating factors allowing test of any desired component and comprehensive modelling.

The engine model 110 can interface with engine control development and test systems 116, 118, 120, 122 in either a Software-in-the Loop (SiL) or Hardware-in-the loop (HiL) environment. The distinction between these two environments will be known to the skilled person and thus is described only briefly below:

In a HiL environment 124, a real control environment is built to interface with the software model representing an engine or vehicle. Therefore, in a HiL environment for the present case, the engine model 110 interfaces with a real engine control unit ECU 116 and real engine actuators 118 and sensors. The remaining components would typically be simulated.

In a SiL environment 126, real control components are simulated in software, which interfaces with the model 110 and simplified engine model. Hence, a single Personal Computer (PC) can run software which replaces the ECU 116 and actuators 118 required in a HiL environment.

Once he has acquired or created a validated complete model 110 of an engine, the user must set steady state and transient targets for the engine and iterate the complete model 110 until these targets are met.

Importantly, the invention in one aspect allows the user, such as a performance simulation engineer, to create a control system strategy and simplified model for an updated engine version. To achieve this a validated model of an existing engine is created or acquired in any appropriate known manner, the steady state and transient targets/limits for the updated engine are set, and the model updated iteratively to meet the new targets.

Thereafter, as described below, simplification of the updated engine model is achieved by an iterative process whereby the updated engine model is repeatedly simplified, run and compared with the full updated model until a discrepancy in results is identified. The simplified updated engine model is then used to design and calibrate/verify control systems allowing real time operation.

Figure 2:
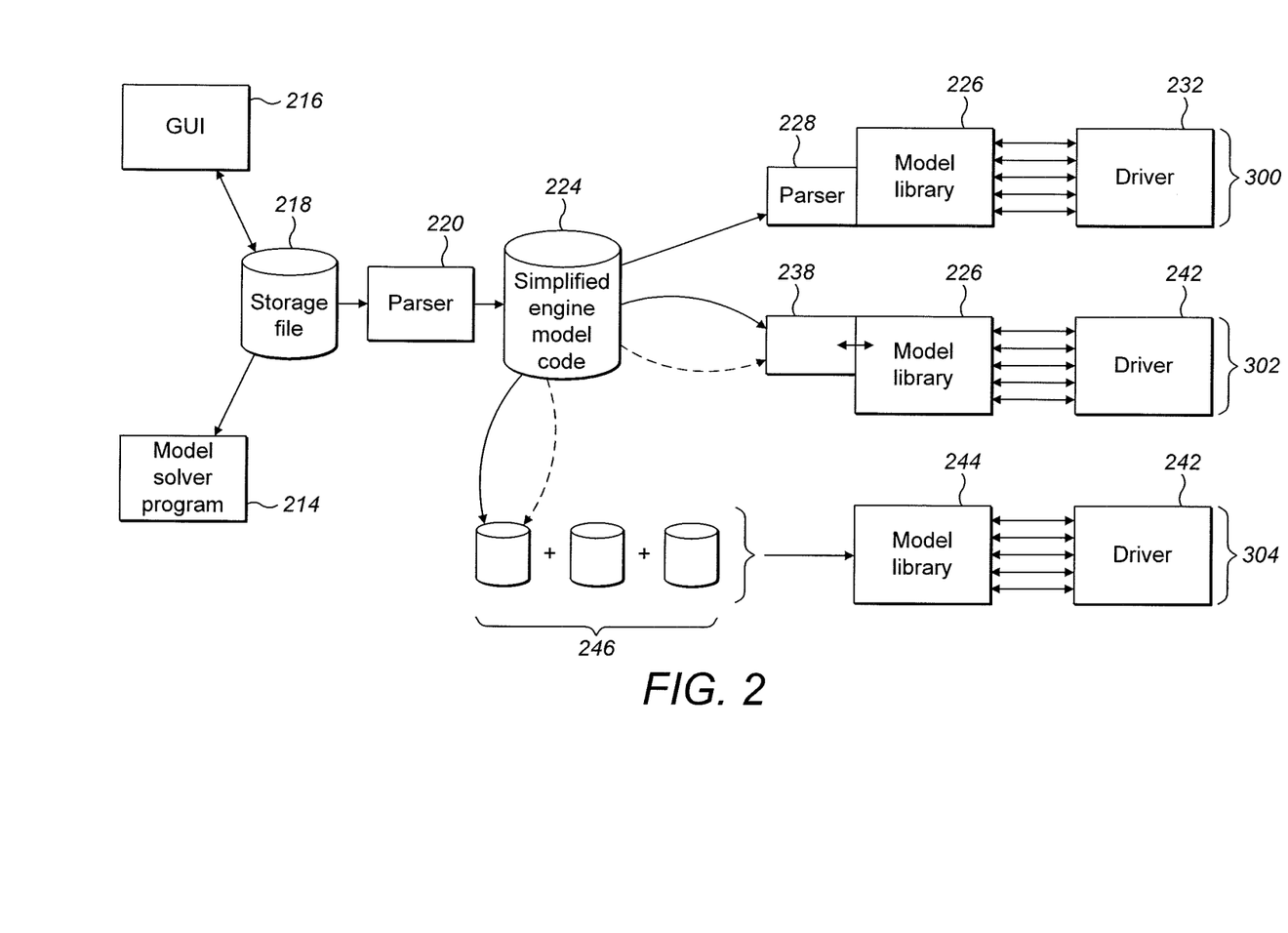
FIG. 2 is a control flow diagram of the modelling tool in operation.

FIG. 2 shows a modelling tool in operation. The modelling tool includes a graphical user interface (GUI) 216, a model persistence mechanism 218 comprising a model storage file, a parser 220 and a coder. In order to operate the modelling tool, the user provides inputs via the GUI 216. The GUI 216 has two modes. The first mode of the GUI 216 provides the user with access to the usual user interface for a complete engine model 112 and allows the user to completely define a model from basic physical building blocks such as ducts, manifolds, cylinders or turbochargers. It allows the user to set up parametric inputs for an engine, the corresponding related manner of operation of which is to be simulated and/or updated. These parametric inputs include measures such as fuelling, fuel flow rate, speed, Exhaust Gas Recirculation (EGR) valve position versus time.

The model storage file 218 stores the user determined modelling information and parametric inputs. A model solver program 214 comprises a full engine simulation program which reads a subset of information from the storage file 218 to obtain input data for its simulation model 110. This enables the model solver to load and run the complete engine model 110 for these parametric inputs to perform simulation and produce output data for the engine comprising baseline validation data. In addition, in the second mode of the GUI (216) selection options are provided for creating the progressively simplified engine model to be stored in model storage file 218. For example, the user is given the option of selecting a start point and an end point within the complete engine model. These start and end points define the boundaries of the simplified engine model 110 for which engine operation is to be simulated. It is also possible to use this second mode to refine the simplified model further within the boundaries defined by the start and end points, as will be described in more detail below.

A parser 220 includes a memory in which a library of rules for extracting and constructing a simplified engine model from storage file 218 is stored. The parser writes the simplified engine model as source code 224 such as C code extracted from appropriate text files and representing the required program functions and data to describe the model 110. The parser is operable to extract information regarding the selected start and end points of simplified engine model from the modeller 218. The parser is further operable to use this information in conjunction with its stored rules to construct the simplified engine model 110.

In operation, once the user has accessed the first mode 214 of the GUI 212 and provided the parametric inputs for the engine, he instructs the modelling tool to create and run the complete model based on these inputs. Running the complete model in this way produces baseline outputs for the engine, which can be used as validation data for the outputs of the subsequent simplified model.

After the validation data has been obtained from the complete engine model, the user selects the second mode. Depending, for example, on the components of the engine which the user wishes to analyse during a simulation, he selects the start and end points of the simplified engine model. The user then instructs the modelling tool 110 to create the simplified engine model and subsequently to run it.

For example in the model shown in FIG. 1, to create the simplified engine model, the parser 220 reads and extracts from the model storage file 218 only the selected model information which lies between the predefined start and end points of the complete engine model. The parser 220 applies the predefined rules stored in its memory to that selected section of the model to construct a simplified engine model. The parser 220 then produces source code 224 representing the simplified engine model. Once the code 224 is produced, the modelling tool 110 can run the simplified model for the parametric inputs which the user has predefined, and compare the engine output data obtained to the validation data previously obtained from running the complete model. This comparison is done by overlaying the two engine output plots which are produced by running the respective models.

Comparison of the two engine output plots should provide a positive validation of the simplified engine model. This being the case, the user then has the option of further modifying the simplified engine model in the second mode. The modification process involves intelligent model reduction in order to further reduce the computational complexity of the model, without prejudicing the accuracy of the results obtained from the model. Intelligent model reduction requires the user to interactively define the manner in which selected elements from the complete engine model are mapped to the simplified engine model. The techniques employed may include splitting large ducts, merging small elements together and excluding any unknown elements for which the user does not wish to analyse engine operation. For example, most WAVE models will contain complicated representations of components such as exhaust and intake sound suppression devices which may be removed if not relevant to the flow control model, without adversely affecting the performance parameter required. Intelligent defaults can also be used for example based on accumulated learning in the tool and/or an understanding of the expected behaviour of the system. During the intelligent model reduction process, no engine modelling information is permanently discarded or lost. Instead, any additional modelling information which is not used in the simplified engine model will be stored by the model storage file 218. This information is preferably stored in Extensible Markup Language (XML) format.

When the user has decided on a first iteration of intelligent model reduction, he instructs the modelling tool via the GUI to create the new simplified engine model. In order to do so, the modelling tool updates the information previously provided to the parser 220 with the modifications made by the user. The parser then re-employs its stored rules, instructing the parser to generate new code 224. Once the new code 224 is produced, it can be run to produce new engine output results. Again, the results output by this model can be validated against the baseline data produced by the complete engine model to verify the accuracy of the simplified engine model. This Simplify-Create-Run-Compare process can be re-iterated to simplify the model up until the point at which further simplification would impair the accuracy of the results produced by the model. The purpose of the intelligent model reduction process is therefore to produce an optimally simplified engine model which will be capable of fast simulation times whilst still producing accurate simulation results, the level of acceptable discrepancy to be preset or user selected dependent on the level of accuracy required.

The simplified engine model code 224 can be implemented in either a SiL environment 300 or a HiL environment 302, 304 for example for further testing of the updated engine model. The code 224 includes static variable declarations and initialisations and/or code for functions expected by the solver 214, such as model initialisations and parameterised polynomial functions and, if necessary, also comprises inline code for identified bottle necks.

If the simplified engine model is to be used in a software-only (SiL) simulation environment 300, a SiL model library 226 contains the compiled common code together with a further parser 228 which can read and extract information from the source code to construct the model.

When the SiL model has been created, it can then be used to simulate engine operation in a software-only environment, and produce simulation results. In order to verify that the model can reproduce the baseline results with adequate accuracy, a SiL driver such as Simulink® 232 is required, available for example from the Mathworks.

The simulation is driven and controlled via the driver 232, via which the user can start and stop a simulation as necessary. The driver module 232 supplies inputs ie actuator values such as throttle angle and fuel flow rate to the components 226, 228, and reads the outputs, ie sensor values, which are output therefrom.

In order to implement the SiL model code 220 in Simulink®, the driver 232 requires a MEX function wrapper. As will be known to the skilled person, a MEX function wrapper comprises an S function which resides in the driver module 232 and which binds the SiL model code to the Simulink® driver program in order to run the simulation. Alternatively the driver program could be provided as a component of the WAVE® environment. Alternatively still, the driver program could comprise an EASY5® modelling package, with a complementary EASY5 extension wrapper function for implementing the SiL model code.

As an alternative or an addition to simulating engine operation in software only, the simulation may be run in a HiL environment. For example, a user may run an engine model simulation in a SiL environment in order to design the engine control system and then use the model in a HiL environment to verify and calibrate the control system. There are two possible HiL simulation environments—a standard environment and an optimised environment.

If the simplified engine model is to be used in the standard HiL environment, the simplified engine model code 224 is compiled and linked to the existing model library 226 of common code. The model can then be used as described above to simulate engine operation in a standard hardware environment for example by embedding the model into a commercial HiL system, using the compiling and linking tools provided by the system and generally as described with reference to FIG. 1 above, and produce simulation results. For example the driver 232 drives the model in conjunction with an Engine Control Unit (ECU) 116. The ECU 116 is linked to actuators 118, which may be real or simulated. In operation, the ECU 116 drives the simulation, controlling start and stop times. Actuator values are input to the model by the driver. In return, sensor values are output by the HiL model.

If the simplified engine model is to be used in the optimal HiL environment, the common code is supplied as source code and compiled with the simplified engine model source code 224 to form an optimised HiL model library 244 from additional source file 246 and subsequent compilation stage.

Like the standard HiL model code 226, 238 the optimised HiL model code can be driven by a driver 242 such as an ECU 116 or other appropriate hardware in order to run a simulation of engine operation and produce simulation results, as described above.

If, during operation, the user wishes to set new steady-state or transient targets for the simulated engine, he must first make the appropriate changes to the complete engine model.

Thereafter, in order to implement those changes into the simplified engine model for use in simulations, the user needs only to access the second mode via the GUI and create a new simplified engine model. There is no need for the user to manually repeat for the simplified engine model those changes which were made to the complete engine model. Instead, this is done automatically by the modelling tool. Before subsequently using the new simplified engine model in engine operation simulations, the user must simply validate the new simplified model by comparing its baseline outputs to those of the complete engine model, as described above.

The modelling tool enables the user to modify other aspects of the simplified engine model simply and efficiently via the GUI. For example, the parametric inputs for the engine can be reset using the first mode. In addition, the user can access the second mode to modify the start and end points of the simplified engine model. The manner in which elements of the engine are mapped from the complete engine model to the simplified engine model can also be amended via the GUI without the need for any calculation or programming input by the user.

The simplified engine model produced by the modelling tool is a physically based crank resolved model. Due to its computational efficiency, the simplified engine model is designed to produce fast simulation times. This makes it suitable for real time implementation, as is discussed in more detail below. In particular the modelling approach in developing the engine model is further illustrated in FIG. 3 which shows a quasi-propagatory model of the type described in "*A New Modelling for the Air and Gas Dynamics in ICE Manifolds Oriented to Air-fuel Ratio Control*", Cippollone et al, Paper No 99-ICE-170, *ICE-Vol.* 32.1, 1999 *Spring technical Conference, ASME* 1999, which is incorporated herein by reference.

Figure 3:
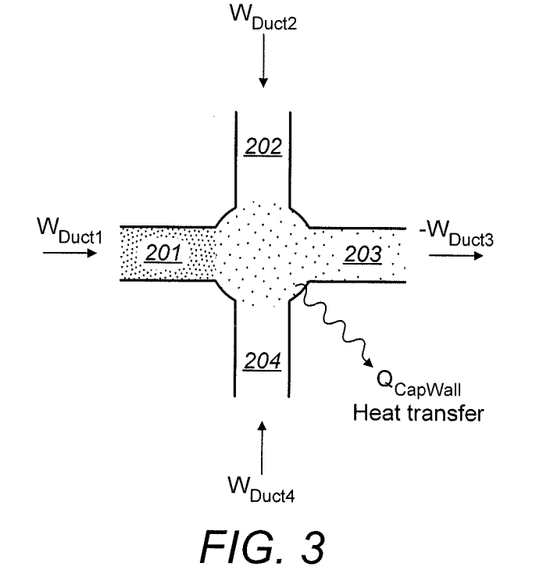
FIG. 3 shows an engine chamber and ducts according to the simplified engine model.

According to this approach engine components can be modelled in terms of duct flows in ducts 201, 202, 203, 204, where capacities empty and fill according to duct flows which can be calculated using neighbouring capacities and pressures accounting for propagation times based on duct length and flow speed. However, any appropriate modelling technique can be adopted.

In addition to using the mapping and modelling techniques described above, the present invention makes the simplified engine model more suitable for real time implementation by manipulating the occurrence and format of mathematical functions in the model. For example, there are a number of mathematical functions provided by the C language math library which are heavily used by gas dynamic solvers and engine simulations, but which are computationally very expensive. Such functions include Logarithm to the base 2 (log 2f), Natural logarithm (log f), Exponentials (expf), Raising a number to the power of 'x' (powf), Square root (sqrtf), Sine (sin f) and Cosine (cos f). Implementing these functions in an engine simulation requires solving complex numerical algorithms, which is time consuming for a CPU. This leads to increased time delay in producing simulation results.

In the present invention, it is recognized that the majority of modern computers share the same internal storage format for decimal numbers (IEEE 754). By making use of the way this format is stored (mantissa and exponent), it is possible to calculate approximations to most of the computationally expensive functions (log 2f, log f, expf, powf, sqrtf) by direct manipulation of memory rather than using traditional mathematical operations. Similarly, for the two trigonometric functions (sine, cosine) it is possible to fit polynomial functions to them that are rapid to calculate and can cover the entire range of inputs.

The modelling tool 110 includes a library of replacement functions which approximate complex mathematical functions as described above. Preferably, the library includes a number of different polynomial approximations which are tailored to suit various respective parts of the engine such as turbomachinery and valve lift profiles. Hence, depending on the start and end points of the simplified model, an appropriate polynomial approximation can be used. The code 224 generated for the simplified engine model uses the replacement functions in place of the corresponding complex mathematical functions. For each function, the loss in accuracy when the approximation is used is not significant enough to impact the results of an engine simulation. However, the reduction in computational complexity of the model greatly reduces the time taken to produce simulation results for the model.

In order to further speed up simulation times for the simplified engine model, the architecture of the modeling tool hardware is taken into account during design of the software. For example, variables or rules which are likely to be used together at any one time will be stored closely together in the memory of the solver 226, 244. The invention recognizes that processors have systems that allow frequently used data to be stored in faster (cache) memory. By storing the model data in C structures, it is likely that an entire modelling element's data will be loaded into the cache when updating it, preventing the need to load in data from distant memory. Similarly by storing the data structures in an array, the CPU running a simulation is able to prefetch "guess" which element to have ready next, again speeding up execution.

In particular the data is structured so that each data item is read from memory sequentially and once every time step. By reading the data from memory sequentially advantage is taken of the prefetch feature whereby the processor reads ahead, if it recognises that sequential locations are being accessed, to the next one or more locations in the sequence, in advance of those locations being requested. This accelerates reading from main memory. In addition the data structured such that while data is being accessed from main memory the processor can carry out processing steps on already retrieved data. This can be done in conjunction with a memory cache for recently retrieved data. As, because of its limited size, the cache is regularly refreshed, instruction data or code, which are often used repeatedly, tend to remain in cache while operational data may be refreshed more frequently than each time step meaning that it must once again be retrieved. As a result retrieval of the data only once per time step can be obtained and instructions stored in cache can be performed on the data whilst further sequential data is retrieved ensuring accelerated processing.

Figure 4:
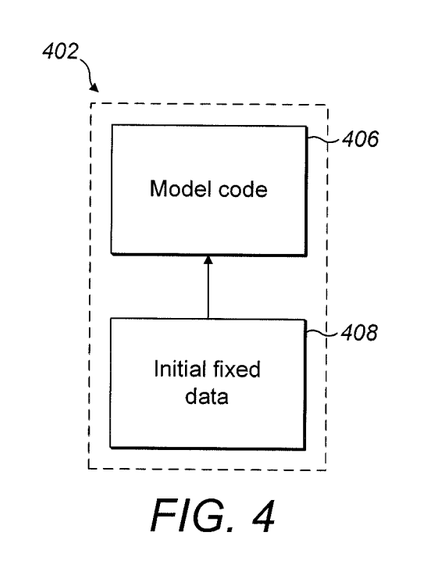
FIG. 4 shows stage one of ECU implementation of the simplified engine model.
Figure 5:
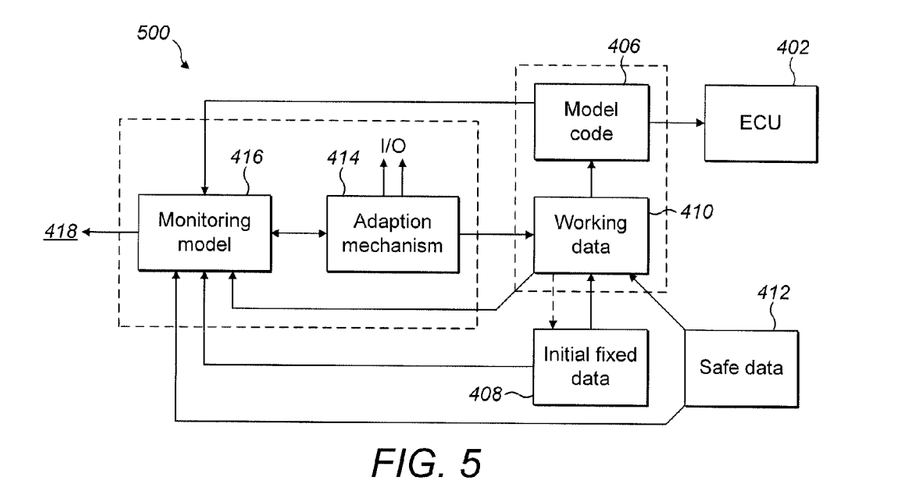
FIG. 5 shows stage two of ECU implementation of the simplified engine model.

As shown in FIGS. 4 and 5, the model described above may be incorporated into an Engine Control Unit (ECU) 402. Typically, known ECU's model engine performance using engine maps comprising calibrated data obtained from previous real-vehicle testing in order to supply parametric values to the ECU 402. In order to utilize the engine maps and model engine operation, known ECU's use mean value modeling techniques, which are based on approximations from the calibration data.

In order to replace the maps and mean value modeling approach in an ECU, the simplified engine model is supplied as a library comprising two parts—code 406 and initial fixed data 408. The library represents a simplified engine model which is derived from a complete engine model as described above. The initial fixed data 408 represents engine parameter values such as fuelling, fuel flow rate, speed and EGR valve position versus time. When the simplified engine model is initially supplied to the ECU 402, these parameter values are fixed.

FIG. 5 shows the second stage 500 of the ECU implementation, wherein the initial fixed data 408 is adapted. The adaptation corrects for wear & tear, temperature changes over time, ageing engine components, and variability between engine models. The adaptation process uses least 3 sets of data: working data 410, initial fixed data 408, and "safe" data 412 for limp home capability. Working data 410 is adapted from initial fixed data 408 over time using an adaptation mechanism 414 including a conventional adaptation algorithm which will be known to the skilled reader, such as recursive least squares, whereby the model values can be updated, for example to minimize discrepancies arising over time between predicted outputs and actual outputs. "Safe" or "limp-home" data 412 is a very robust set of data that would keep the engine running in any feasible circumstances.

The adaptation process is monitored by a suitable monitoring module 416, which communicates with on board diagnostics (OBD) 418 for the vehicle, as well as to the model 406 and preferably via the adaption mechanism 414 to all three sets of data 408, 410, 412. If the monitoring module 416 detects that working data 410 moves too far from the initial fixed data 408, for example if any parameter has varied by more than 10% from its original value, the model will revert to "safe" data 412. The monitoring module 416 will set an OBD code to flag this step and will stop future adaptation.

In an alternative embodiment of the adaptation process, when working data 410 moves too far from the initial fixed data 408 the model may revert back to the initial fixed data 408. Thereafter, it should only go to "safe" data 412 if the working data 410 keeps failing. According to a further alternative, appropriate sanity checks on various sensors may be used. If one sensor fails then an appropriate "safe" data set 412 should be used.

The embodiments of present invention provide several advantages over known modelling and simulation techniques. In particular, they recognise that it is possible to simplify a crank resolved engine model in order to produce real time simulation results, without compromising the accuracy of the results obtained. This recognition contrasts the technical prejudice in the art, wherein crank resolved models are becoming more complicated and computationally intensive as PC computational ability increases, and therefore are becoming less suited to real-time simulation.

The simplified engine model enables the user to use real-time simulations to analyse engine operation, focusing on the components of the engine in which they are interested. For example, if the user wishes to analyse engine operation only in the combustion chambers of the engine, they can select a simplified model which excludes complex intake and exhaust components which would slow down the simulation. The intelligent model reduction process through which the user can interactively define the manner in which elements are mapped from the complete engine model to the simplified engine model further enhances the usefulness of the simplified engine model. For example, the user can merge a number of small elements together in the model. This is useful if they are interested in in-cycle events either side of those elements but not in the elements themselves, or if the variation of engine activity between those elements is sufficiently insignificant that they can be treated as a single element without affecting the accuracy of the simulation results. The skilled person will appreciate that it is preferable to reduce the number of elements in the model, as this reduces the number of calculations required in a simulation cycle.

Figure 6:
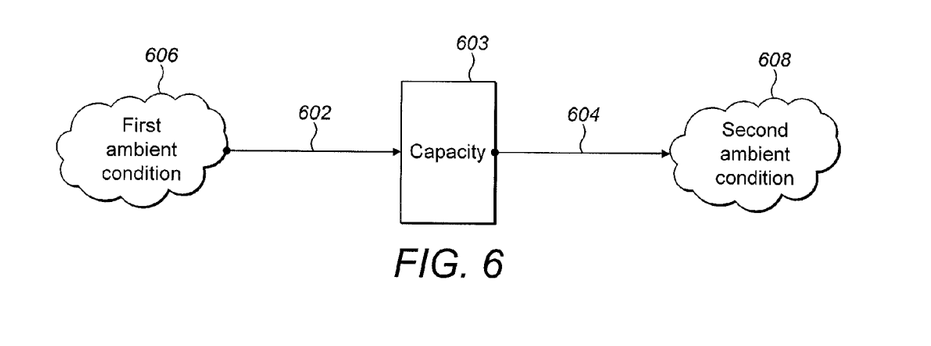
FIG. 6 shows an intake manifold connected to an exhaust manifold according to the simplified flow model.

FIGS. 6 to 8b demonstrate the reliability of simulation results produced by simplified modelling techniques as described above. FIG. 6 models the propagation of pressure from an exhaust manifold to an intake manifold in an engine. If a known crank resolved modelling technique were used for this model, for example employing a full WAVE® engine model, the model would comprise approximately 60 modelling elements. In contrast, the simplified model of FIG. 6 comprises only 5 elements which include: a first duct 602, a second duct 604, a single capacity 603 604 representing the volumes of ducts, a first ambient condition 606 and a second ambient condition 608. Only the first and second ducts 602, 604 and the capacity 604 have associated dynamics in the model. Hence the number of elements for which dynamic computation is required is reduced twenty fold.

Figure 7A:
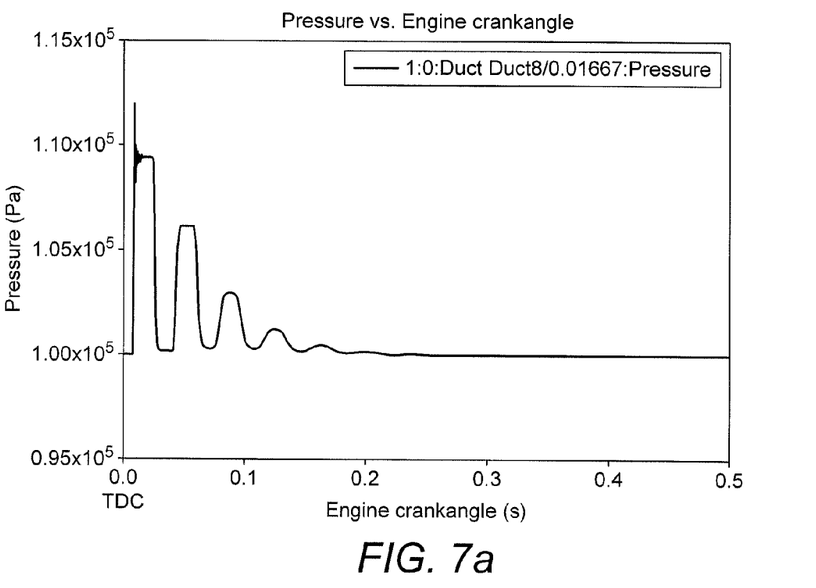
FIG. 7a shows a simulation plot of Pressure versus crank angle for the section modelled in FIG. 6, as obtained from a complete flow model.
Figure 7B:
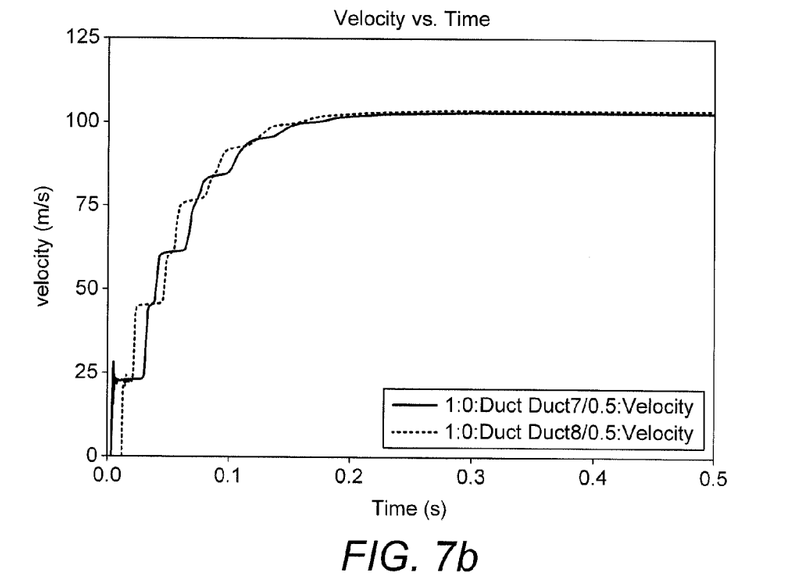
FIG. 7b shows a simulation plot of Velocity versus time for each duct shown in FIG. 6, as obtained from a complete flow model.
Figure 8A:
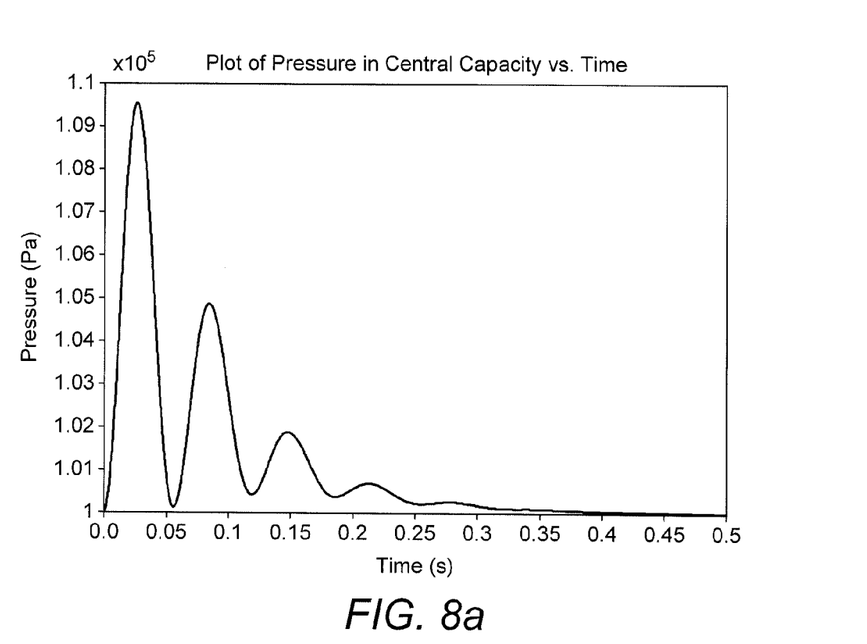
FIG. 8a shows a simulation plot of Pressure versus crank angle for the central capacity in FIG. 6, as obtained from a simplified flow model.
Figure 8B:
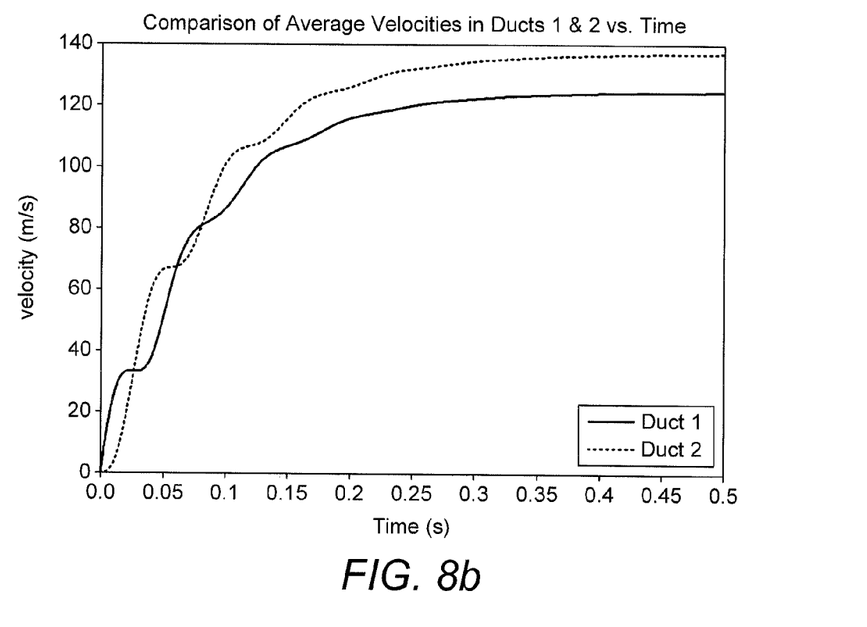
FIG. 8b shows a simulation plot of Velocity versus time for the central capacity of FIG. 6, as obtained from a simplified flow model.

FIGS. 7a and 8a show plots of pressure midway between the exhaust manifold and intake manifold as obtained for a complete engine model 112 and the simplified model of FIG. 6 respectively. Similarly, FIGS. 7b and 8b show plots of velocity of air propagation in the two ducts (602, 604) as obtained for a complete engine model 112 and the simplified model of FIG. 6 respectively. It can be seen from these figures that any loss in accuracy for the simplified model is insignificant as compared to the degree of simplification between the two models.

The modelling techniques according to the present embodiments provide a further advantage over known modelling techniques because of the reduced need for calibration data as compared to, for example, mean value modelling. It will be appreciated by the skilled person that obtaining calibration data from either a test bed or real vehicle tests is both time consuming and expensive. Furthermore, it requires that development of the engine should be at the stage where it is possible to build a test vehicle or test bed. In some cases, the user will wish to run engine simulations and analyse engine control strategies before the engine development has reached the building stage. Because the simplified engine model can produce reliable, real time simulation results without relying on calibration data and approximations, it reduces the amount of engine test data required early in the development cycle of an engine.

Because, in known systems, crank resolved models are computationally expensive in a simulation environment, it is not possible to use them in real-time simulations of engine operation. Instead, control system simulations which rely on approximations are used in their place. Although these control system simulations can be initially validated against their donor crank-resolved simulations, once the required validation criteria are met, the link between the two systems is lost. Hence, in known systems, further refinement and/or development of the full crank-resolved model will not automatically be carried over to the simpler control-oriented model. Instead, in order to carry refinements to the control-oriented model, the link between the two models would have to be established, which could involve the user acquiring further test data and/or performing further programming steps. In contrast, because the definition of the simplified engine model of the present invention is held in the persistence mechanism of the complete engine model, any modifications made to the complete model will map to the subsequently-created simplified model. The simplified model therefore reduces the development timescales of engine control strategies.

As indicated above, in a further recognition that simplification of a complete crank-resolved model can yield accurate, real-time results without the reliance on test bed data and mean value approximations, the simplified engine model employs simple mathematical functions in place of complex, computationally intensive functions which usually must be solved in crank-resolved model simulations. Whilst it is the usual practice in the art to rely on complex numerical algorithms and partial differential equations in crank-resolved model simulations, the simplified engine model of the present invention enables accurate simulations to be run using ordinary differential equations and fixed step solutions. The replacement functions employed in the simplified engine model rely on the manipulation of processor memory rather than traditional mathematical operations. Hence, when the simplified engine model is run in a simulation environment it can produce accurate results much more quickly than traditional crank-resolved models can.

By analysing the architecture of the hardware on which the modelling software is to be stored when designing that software, the modelling techniques described above are further enhanced. The modelling techniques optimise the operational characteristics of, for example, processor memory in order to speed up processing of the stored software during a simulation cycle. Techniques such as these are not used in known modelling approaches. Instead, it is common practice in the art to increase the complexity of modelling software as the processing ability of the corresponding hardware increases, without considering whether or not it is necessary to do so or whether the software is optimally suited to the architecture of the hardware.

The simplified engine model and associated modelling tool provide more consistent software quality assurance than prior art models. The concepts employed are generic to hardware chips in a wide class and therefore the modelling software will be accessible by the majority of users for modelling almost any engine.

The simplified engine model is a highly useful practical tool as it can run in different forms depending on target platform specifications. The simplified model code can either be read and directly implemented into a software-in-the-loop simulation environment, or it can be compiled and run in a hardware-in-the-loop environment. The simplified engine model can also be run in an Engine Control Unit (ECU), replacing known engine maps and mean value modelling, which produce much more crude simulation results than those achieved by the simplified engine model. It will further be appreciated that the simplified engine model may be used in real-time modelling suitable to both current and future control architectures, for example Common-rail Fuel Injection equipment and Cylinder Pressure based EMS's as well as during actual real time engine use to estimate operating condition in the engine and guide the control strategy accordingly.

Whilst the simplified engine model and modelling tool are described above principally in relation to vehicle engines, it will be appreciated that they can be applied in any industry that develops control systems for reciprocating engines, for example the power industry. The complete engine model has been described as a WAVE® model; however any suitable software package can be used to generate the complete engine model. Similarly, the SiL simulations have been described as running on Simulink®, or EASY5® software; however any appropriate software can be used.

The invention claimed is:

1. A method of creating a physically based crank-resolved simplified computer implementable engine model, the method comprising:
    obtaining a complete crank-resolved computer implementable engine model,
        wherein the complete crank-resolved computer implementable engine model is operable to simulate engine operation of the entire engine, including simulating wave-action effects throughout the engine, and produce outputs based on parametric inputs to the engine;
    selecting, from the complete crank-resolved computer implementable engine model, one or more elements defining start and end points of the physically based crank-resolved simplified computer implementable engine model which is to be created;
    obtaining from a library of rules, at least one computer implementable model creation rule corresponding to the one or more selected elements;
    creating, using a computer, the physically based crank-resolved simplified computer implementable engine model using the at least one computer implementable model creation rule,
        wherein the physically based crank-resolved simplified computer implementable engine model is also operable to simulate engine operation, including simulating wave-action effects throughout the simplified engine model, and produce outputs in real time based on the parametric inputs to the engine;
    wherein said simplified computer implementable engine model employs an approximation for a mathematical function employed by the complete crank-resolved engine model, comprising:
        identifying an operation which the complete crank-resolved engine model employs, for which a corresponding mathematical function requires a complex numerical algorithm;
        obtaining an approximation to the mathematical function which requires a simplified algorithm; and
        generating a control rule under which, when a simplified engine model implementing the operation is created from the complete crank-resolved engine model, the approximation will be employed instead of the mathematical function, and
        wherein said generated control rule is stored in a module which is operable to create a simplified engine model from the complete crank-resolved engine model; and
    simulating engine operation, including simulating wave-action effects throughout the simplified engine model, using the computer and the physically based crank-resolved simplified computer implementable engine model.

2. The method as claimed in claim 1, wherein the step of using the at least one computer implementable model creation rule to create the physically based crank-resolved simplified computer implementable engine model includes generating a computer code representing the simplified model.

3. The method as claimed in claim 1 wherein the elements defining the simplified model comprise a start point and/or end point from within the complete crank-resolved engine model.

4. The method as claimed in claim 1 further comprising the step of validating the simplified engine model by comparing an output from the simplified engine model under an operating condition to a corresponding output from the complete crank-resolved engine model.

5. The method of creating a physically based crank-resolved simplified computer implementable engine model as claimed in claim 1, further comprising:
    comparing an output from the physically based crank-resolved simplified computer implementable engine model under an operating condition to a corresponding output from the complete crank-resolved model,
    modifying an arrangement of the engine elements to create a further simplified engine model in the event that said comparison indicates that the output from the physically based crank-resolved simplified computer implementable engine model is accurate to within a predetermined level of required accuracy, wherein modifying the arrangement of engine elements in the further simplified engine model includes at least one of eliminating an unknown element, merging two elements to form a single new element, and splitting an element to form two new elements.

6. A method of simulating engine operation comprising:

creating a physically based crank-resolved simplified computer implementable engine model comprising obtaining a complete crank-resolved computer implementable engine model, wherein the complete crank-resolved computer implementable engine model is operable to simulate engine operation of the entire engine, including simulating wave-action effects throughout the engine, and produce outputs based on parametric inputs to the engine;

wherein said simplified computer implementable engine model employs an approximation for a mathematical function employed by the complete crank-resolved engine model, comprising:

identifying an operation which the complete crank-resolved engine model employs, for which a corresponding mathematical function requires a complex numerical algorithm;

obtaining an approximation to the mathematical function which requires a simplified algorithm; and generating a control rule under which, when a simplified engine model implementing the operation is created from the complete crank-resolved engine model, the approximation will be employed instead of the mathematical function, and wherein said generated control rule is stored in a module which is operable to create a simplified engine model from the complete crank-resolved engine model;

selecting, from the complete crank-resolved computer implementable engine model, elements defining the start and end points of the physically based crank-resolved simplified engine model which is to be created;

obtaining from a library of rules, at least one computer implementable model creation rule corresponding to the selected elements; and using the at least one computer implementable model creation rule to create the physically based crank-resolved simplified computer implementable engine model, wherein the physically based crank-resolved simplified computer implementable engine model is also operable to simulate engine operation, including simulating wave-action effects throughout the crank-resolved simplified computer implementable engine model, and produce outputs in real time based on the parametric inputs to the engine:

incorporating the physically based crank-resolved simplified computer implementable engine model into an engine simulation environment; and running an engine simulation using the physically based crank-resolved simplified computer implementable engine model.

7. The method of simulating engine operation as claimed in claim 6, wherein the engine simulation environment is one of a software environment and a hardware environment, and wherein the simulation environment includes an engine control unit.

8. The method of claim 6 further comprising:

comparing an output of the simulation against an expected output.

9. A non-transitory computer-readable medium comprising a computer program, which when executed by a processor, performs a method of creating a physically based crank-resolved simplified engine model, the method comprising:

obtaining a complete crank-resolved computer implementable engine model, wherein the complete crank-resolved computer implementable engine model is operable to simulate engine operation of the entire engine, including simulating wave-action effects throughout the engine, and produce outputs based on parametric inputs to the engine;

wherein said simplified computer implementable engine model employs an approximation for a mathematical function employed by the complete crank-resolved engine model, comprising:

identifying an operation which the complete crank-resolved engine model employs, for which a corresponding mathematical function requires a complex numerical algorithm;

obtaining an approximation to the mathematical function which requires a simplified algorithm; and generating a control rule under which, when a simplified engine model implementing the operation is created from the complete crank-resolved engine model, the approximation will be employed instead of the mathematical function, and wherein said generated control rule is stored in a module which is operable to create a simplified engine model from the complete crank-resolved engine model;

selecting, from the complete crank-resolved computer implementable engine model, elements defining the start and end points of the physically based crank-resolved simplified engine model which is to be created;

obtaining from a library of rules, at least one computer implementable model creation rule corresponding to the selected elements; and using the at least one computer implementable model creation rule to create the physically based crank-resolved simplified computer implementable engine model, wherein the physically based crank-resolved simplified computer implementable engine model is also operable to simulate engine operation, including simulating wave-action effects throughout the crank-resolved computer implementable engine model, and produce outputs in real time based on the parametric inputs to the engine.

10. A method of operating an engine using an engine control unit comprising:

running a physically based crank-resolved computer implementable engine simulation model including initial engine data and working engine data, the model created by:

obtaining a complete crank-resolved computer implementable engine model, wherein the complete crank-resolved computer implementable engine model is operable to simulate engine operation of the entire engine, including simulating wave-action effects throughout the engine, and produce outputs based on parametric inputs to the engine;

selecting, from the complete crank-resolved computer implementable engine model, elements defining start and end points of the physically based crank-resolved simplified engine model which is to be created;

obtaining from a library of rules, at least one computer implementable model creation rule corresponding to the selected elements; and using the at least one computer implementable model creation rule to create the physically based crank-resolved simplified computer implementable engine model, wherein the physically based crank-resolved simplified computer implementable engine model is also operable to simulate engine operation, including simulating wave-action effects throughout the crank-resolved simplified computer implementable engine model, and produce outputs in real time based on the parametric inputs to the engine;

wherein said simplified computer implementable engine model employs an approximation for a mathematical function employed by the complete crank-resolved engine model, comprising:

identifying an operation which the complete crank-resolved engine model employs, for which a corresponding mathematical function requires a complex numerical algorithm;

obtaining an approximation to the mathematical function which requires a simplified algorithm; and generating a control rule under which, when a simplified engine model implementing the operation is created from the complete crank-resolved engine model, the approximation will be employed instead of the mathematical function, and wherein said generated control rule is stored in a module which is operable to create a simplified engine model from the complete crank-resolved engine model;

actively updating the physically based crank-resolved computer implementable engine simulation model by replacing the initial engine data with working engine data; and monitoring a parameter of the engine and updating the working engine data in response to said monitoring, wherein the working data is replaced by a default data if it diverges from the default data beyond a divergence threshold.

* * * * *